United States Patent
Lee et al.

(10) Patent No.: US 11,541,718 B2
(45) Date of Patent: Jan. 3, 2023

(54) THERMAL MANAGEMENT SYSTEM FOR VEHICLE AND METHOD FOR CONTROLLING WATER-HEATING PTC HEATER THEREOF

(71) Applicant: Hanon Systems, Daejeon (KR)

(72) Inventors: Seung Ho Lee, Daejeon (KR); Young Chul Kim, Daejeon (KR); Seo-Jun Yoon, Daejeon (KR); Jae Min Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 251 days.

(21) Appl. No.: 16/500,870

(22) PCT Filed: Mar. 29, 2018

(86) PCT No.: PCT/KR2018/003722
§ 371 (c)(1),
(2) Date: Oct. 4, 2019

(87) PCT Pub. No.: WO2018/186624
PCT Pub. Date: Oct. 11, 2018

(65) Prior Publication Data
US 2020/0031193 A1    Jan. 30, 2020

(30) Foreign Application Priority Data

Apr. 5, 2017 (KR) .................. 10-2017-0044209
Mar. 28, 2018 (KR) .................. 10-2018-0035683

(51) Int. Cl.
*B60H 1/00* (2006.01)
*B60H 1/14* (2006.01)
(Continued)

(52) U.S. Cl.
CPC ..... *B60H 1/00278* (2013.01); *B60H 1/00007* (2013.01); *B60H 1/143* (2013.01);
(Continued)

(58) Field of Classification Search
CPC ............ B60H 1/00278; B60H 1/00007; B60H 1/143; B60H 1/2218; B60H 1/2221;
(Continued)

(56) References Cited

U.S. PATENT DOCUMENTS 5,450,894 A * 9/1995 Inoue .................. B60H 1/00842
454/907
6,002,105 A * 12/1999 Tamada ............... B60H 1/2218
219/202
(Continued)

FOREIGN PATENT DOCUMENTS

JP    2014-037180 A    2/2014
KR    2012-0103054 A   9/2012
(Continued)

OTHER PUBLICATIONS

International Search Report issued in PCT/KR2018/003722 dated Jun. 28, 2018.

*Primary Examiner* — Ljiljana V. Ciric
(74) *Attorney, Agent, or Firm* — Norton Rose Fulbright US LLP; James R. Crawford

(57) ABSTRACT

A thermal management system for a vehicle and method for controlling a water-heating type PTC heater thereof by controlling a PTC heater that uses water for heating, in which a heat source for heating is secured by operating the water-heating type PTC heater and thereby additionally heating a coolant, while charging a battery, in a thermal management system for a vehicle, during a heating mode, in which: refrigerant circulates through a second heat exchanger, a waste heat recovery chiller, a compressor and an indoor heat exchanger; and the coolant passes through a water-cooling type battery module, the water-heating type PTC heater, a battery chiller, electric parts and the waste heat recovery chiller.

11 Claims, 9 Drawing Sheets

(51) Int. Cl.
*B60H 1/22* (2006.01)
*H01M 10/6567* (2014.01)
*H01M 10/615* (2014.01)
*H01M 10/625* (2014.01)
*H01M 10/637* (2014.01)
*H01M 10/44* (2006.01)
*H01M 10/63* (2014.01)

(52) U.S. Cl.
CPC ......... *B60H 1/2218* (2013.01); *B60H 1/2221* (2013.01); *H01M 10/443* (2013.01); *H01M 10/615* (2015.04); *H01M 10/625* (2015.04); *H01M 10/63* (2015.04); *H01M 10/637* (2015.04); *H01M 10/6567* (2015.04); *B60H 2001/00307* (2013.01); *H01M 2220/20* (2013.01)

(58) Field of Classification Search
CPC ...... B60H 2001/00307; B60H 1/00392; B60H 1/00807; H01M 10/443; H01M 10/615; H01M 10/625; H01M 10/63; H01M 10/637; H01M 10/6567; H01M 2220/20; Y02E 60/10
See application file for complete search history.

(56) References Cited

U.S. PATENT DOCUMENTS

| | | | | |
|---|---|---|---|---|
| 2012/0240604 A1* | 9/2012 | Choi | ................ | B60H 1/00921 165/41 |
| 2012/0297805 A1* | 11/2012 | Kamada | ............ | B60H 1/32281 62/208 |
| 2012/0318012 A1* | 12/2012 | Choi | ..................... | B60H 1/143 62/238.7 |
| 2013/0192272 A1* | 8/2013 | Ranalli | ................. | B60L 1/003 62/3.3 |
| 2014/0069123 A1* | 3/2014 | Kim | ..................... | F25B 30/02 165/59 |
| 2014/0144998 A1* | 5/2014 | Ichishi | .................... | B60H 1/04 237/12.3 A |
| 2015/0122472 A1* | 5/2015 | Higuchi | ............... | F25B 49/022 165/202 |
| 2015/0217622 A1* | 8/2015 | Enomoto | ........... | B60H 1/00385 62/244 |
| 2016/0233563 A1* | 8/2016 | Oshima | ................. | H01M 50/20 |
| 2016/0318499 A1* | 11/2016 | Yamanaka | ............... | B60L 58/27 |
| 2016/0332505 A1* | 11/2016 | Yamanaka | ......... | B60H 1/00385 |
| 2016/0339761 A1* | 11/2016 | Enomoto | ........... | B60H 1/00899 |
| 2016/0339767 A1* | 11/2016 | Enomoto | ............ | F25B 29/003 |
| 2017/0021698 A1* | 1/2017 | Hatakeyama | ......... | F25B 25/005 |
| 2017/0028813 A1* | 2/2017 | Enomoto | ........... | B60H 1/00899 |
| 2018/0178615 A1* | 6/2018 | Xia | .................... | B60H 1/00392 |
| 2018/0312036 A1* | 11/2018 | Kim | .................... | B60H 1/00921 |
| 2019/0126717 A1* | 5/2019 | Shuto | .................... | B60W 10/30 |
| 2020/0031193 A1* | 1/2020 | Lee | ..................... | H01M 10/637 |
| 2020/0047583 A1* | 2/2020 | Ishizeki | ............. | H01M 10/633 |
| 2020/0070619 A1* | 3/2020 | Kim | .................... | B60H 1/00899 |
| 2020/0122544 A1* | 4/2020 | Ishizeki | ............. | B60H 1/00921 |
| 2020/0171919 A1* | 6/2020 | Ishizeki | ............. | B60H 1/00914 |
| 2020/0207182 A1* | 7/2020 | Ishizeki | ................ | B60H 1/143 |
| 2020/0247252 A1* | 8/2020 | Dudar | .................... | B60L 50/60 |
| 2021/0053689 A1* | 2/2021 | Lynn | .................... | H01M 10/486 |
| 2021/0300146 A1* | 9/2021 | Ishizeki | ............... | B60H 1/3205 |
| 2021/0309070 A1* | 10/2021 | Ishizeki | ............. | B60H 1/32011 |
| 2021/0316594 A1* | 10/2021 | Kawano | ............. | B60H 1/00278 |
| 2022/0009309 A1* | 1/2022 | Miura | ...................... | F25B 5/02 |
| 2022/0009310 A1* | 1/2022 | Ohara | .................... | B60H 1/143 |
| 2022/0011006 A1* | 1/2022 | Miura | ............... | B60H 1/32284 |
| 2022/0032725 A1* | 2/2022 | Miyakoshi | ......... | B60H 1/00792 |
| 2022/0176776 A1* | 6/2022 | Lee | .......................... | B60H 1/00 |

FOREIGN PATENT DOCUMENTS

| | | |
|---|---|---|
| KR | 2013-0026872 A | 3/2013 |
| KR | 2015-0026176 A | 3/2015 |
| KR | 2017-0008603 A | 1/2017 |
| KR | 2017-0013437 A | 2/2017 |

\* cited by examiner

THERMAL MANAGEMENT SYSTEM FOR VEHICLE AND METHOD FOR CONTROLLING WATER-HEATING PTC HEATER THEREOF

This application is a national phase under 35 U.S.C. § 371 of International Application No. PCT/KR2018/003722 filed Mar. 29, 2018, which claims the benefit of priority from Korean Patent Application Nos. 10-2017-0044209 filed on Apr. 5, 2017, and 10-2018-0035683 filed on Mar. 28, 2018, each of which is hereby incorporated by reference in its entirety.

TECHNICAL FIELD

The present invention relates to a method for controlling a water-heating type PTC heater of a thermal management system for a vehicle, and more particularly, to a method for controlling a water-heating type PTC heater, in which a heat source for heating is secured by operating the water-heating type PTC heater and thereby additionally heating coolant, while charging a battery, in a thermal management system for a vehicle, during a heating mode, in which: refrigerant circulates through a second heat exchanger, a waste heat recovery chiller, a compressor, and an indoor heat exchanger; and the coolant passes through a water-cooling type battery module, the water-heating type PTC heater, a battery chiller, an electric part, and the waste heat recovery chiller.

BACKGROUND ART

A vehicle having an engine as a driving source with gasoline, diesel, or the like as an energy source is currently a general type of vehicle. However, such an energy source for a vehicle causes various problems such as environmental pollution and decrease in oil reserves, and the necessity of new energy sources is increasing. One of the current technologies that are almost in practical use is a vehicle driven using a fuel cell as an energy source.

However, it is not possible to utilize a heating system using coolant in such a vehicle using a fuel cell, unlike a conventional vehicle using an engine with oil as an energy source. That is, in the conventional vehicle having an engine as a driving source with oil as an energy source, a great amount of heat is generated from the engine, a coolant circulation system for cooling the engine is provided, and the heat absorbed from the engine to the coolant is used for heating the inside of the vehicle. However, the driving source of the vehicle using the fuel cell does not generate such a great amount of heat as generated from the engine. For this reason, there has been a limit in using the conventional heating system.

Accordingly, various studies have been performed for the fuel cell vehicle. For example, a heat pump to be used as a heat source may be added to an air conditioning system, or a separate heat source such as an electric heater may be provided.

As a related technology, Korean Patent Laid-Open Publication No. 2012-0103054 (published on Sep. 19, 2012, and entitled "HEAT PUMP SYSTEM FOR VEHICLE") has been disclosed.

FIG. 1 is a configuration diagram of a conventional heat pump system 10 for a vehicle.

As illustrated in FIG. 1, the heat pump system for a vehicle largely includes an outdoor heat exchanger 11, an indoor heat exchanger 12, an evaporator 13, a compressor 14, an expansion means 15, a waste heat recovery chiller 16, a battery chiller 17, and a water-cooling type battery module 18.

In the heat pump system 10 for a vehicle, during a heating mode, refrigerant is expanded, and the expanded refrigerant is vaporized in the outdoor heat exchanger and then secondarily vaporized again in the waste heat recovery chiller. Thereafter, the vaporized refrigerant is introduced into the compressor.

At this time, coolant having passed through the water-cooling type battery module recovers energy released from a power electronics (PE) part, which is an electric part for driving an electric vehicle, such as an on-board charger (OBC), a motor, or an electric power control unit (EPCU), and then vaporizes the refrigerant secondarily while passing through the waste heat recovery chiller.

That is, the heat pump system for a vehicle uses the heat generated when the battery is cooled and the PE part is operated, as a heat source of a heat pump. However, there has been a problem in that a sufficient heat source is not supplied to the heat pump when operated, resulting in deterioration of the heat pump efficiency.

In addition, there has been a limit in the heat pump system for a vehicle in that waste heat from the battery and from the PE part can be used only under a substantially high load condition.

RELATED ART DOCUMENT

Patent Document

Korean Patent Laid-Open Publication No. 2012-0103054 (published on Sep. 19, 2012, and entitled "HEAT PUMP SYSTEM FOR VEHICLE")

DISCLOSURE

Technical Problem

An object of the present invention is to provide a method for controlling a water-heating type PTC heater, in which a heat source for heating is secured by operating the water-heating type PTC heater and thereby additionally heating coolant, while charging a battery, in a thermal management system for a vehicle, during a heating mode, in which: refrigerant circulates through a second heat exchanger, a waste heat recovery chiller, a compressor, and an indoor heat exchanger; and the coolant passes through a water-cooling type battery module, the water-heating type PTC heater, a battery chiller, an electric part, and the waste heat recovery chiller.

Technical Solution

In one general aspect, a thermal management system for a vehicle includes: a refrigerant line R having thereon a compressor 140, a first heat exchanger, a second heat exchanger 110, and an expansion means 150; a coolant line W through which coolant for cooling or heating a battery is circulated and on which a water-heating type PTC heater 190 is disposed; and a controller 300 controlling the coolant to be maintained at a predetermined temperature or above, while charging the battery, using the water-heating type PTC heater 190.

The thermal management system for a vehicle may further include, on the coolant line W, an electric part 200, a waste heat recovery chiller 160 supplying waste heat from the electric part 200 to the refrigerant line, and a battery chiller 170 cooling the battery using refrigerant. A heat source supplied from the water-heating type PTC heater 190 may be supplied to the refrigerant line R through the waste heat recovery chiller 160.

If it is determined that an ambient temperature and a coolant temperature are predetermined temperatures or below while charging the battery, the controller 300 may control the water-heating type PTC heater 190 to be turned on to store heat in the coolant line W.

Meanwhile, the first heat exchanger may be an indoor heat exchanger 120 or a coolant-refrigerant heat exchanger 122.

If the first heat exchanger is the indoor heat exchanger 120, the thermal management system for a vehicle may be configured such that during a heating mode, refrigerant circulates through the second heat exchanger 110, a waste heat recovery chiller 160, the compressor 140, and the indoor heat exchanger 120, and the coolant passes through a water-cooling type battery module 180, the water-heating type PTC heater 190, a battery chiller 170, an electric part 200, and the waste heat recovery chiller 160.

The thermal management system for a vehicle may further include a heater core 124 connected to the coolant-refrigerant heat exchanger 122 through the coolant line W or a separate coolant line W', when the first heat exchanger is the coolant-refrigerant heat exchanger 122.

At this time, the thermal management system for a vehicle is configured such that during a heating mode, refrigerant circulates through the second heat exchanger 110, a waste heat recovery chiller 160, the compressor 140, and the coolant-refrigerant heat exchanger 122, and the coolant passes through a water-cooling type battery module 180, the water-heating type PTC heater 190, a battery chiller 170, an electric part 200, and the waste heat recovery chiller 160.

In another general aspect, a method for controlling a water-heating type PTC heater includes: a first step of charging a battery of the water-cooling type battery module 180; a second step of measuring an ambient temperature; a 2-1-st step of turning off the water-heating type PTC heater 190, if the ambient temperature is higher than a first preset temperature; a third step of measuring a coolant temperature, if the ambient temperature is lower than the first preset temperature; a 3-1-st step of turning off the water-heating type PTC heater 190, if the coolant temperature is higher than a second preset temperature; and a fourth step of turning on the water-heating type PTC heater 190, if the coolant temperature is lower than the second preset temperature.

The second preset temperature may be set to be higher than a coolant temperature for properly operating the battery.

The second preset temperature may be set to be 15 to 25% higher than the coolant temperature for properly operating the battery.

After the water-heating type PTC heater 190 is turned on in the fourth step, the third step and the fourth step may be repeatedly performed until the coolant temperature reaches the second preset temperature.

Thermal energy stored in the PTC heater in the fourth step may be recovered in the waste heat recovery chiller 160 to be used as a heat source for heating when the thermal management system 1 for a vehicle is operated in a heating mode.

Advantageous Effects

The method for controlling a water-heating type PTC heater according to the present invention is advantageous in that a heat source for heating can be secured by operating the water-heating type PTC heater and thereby additionally heating coolant, while charging a battery, in a thermal management system for a vehicle, in which: refrigerant circulates through a second heat exchanger, a waste heat recovery chiller, a compressor, and an indoor heat exchanger; and the coolant passes through a water-cooling type battery module, the water-heating type PTC heater, a battery chiller, an electric part, and the waste heat recovery chiller.

In other words, the coolant has been heated only to a predetermined temperature while charging a battery in the winter in order to improve battery efficiency in a conventional thermal management system for a vehicle, whereas coolant is additionally heated up to a temperature higher than the temperature that the battery requires by using the water-heating type PTC heater while charging a battery in the present invention, thereby securing a heat source for heating.

Meanwhile, in electric vehicles, the total mileage depending on fuel efficiency is a very important factor. Typically, a decrease in mileage is greatly affected by energy consumption for heating. However, the present invention uses electric energy at the time of charging, and thus the fuel efficiency is not affected. Furthermore, a heat source for heating is sufficiently secured at the beginning of driving, thereby securing heat pump efficiency and increasing fuel efficiency.

Based on the rise in pressure by increasing a temperature of the heat source of the heat pump, the present invention is also capable of reducing power consumption for air conditioning, and accordingly, an improvement of the electric vehicle in fuel efficiency can be expected.

DESCRIPTION OF REFERENCE NUMERALS

Figure 1:
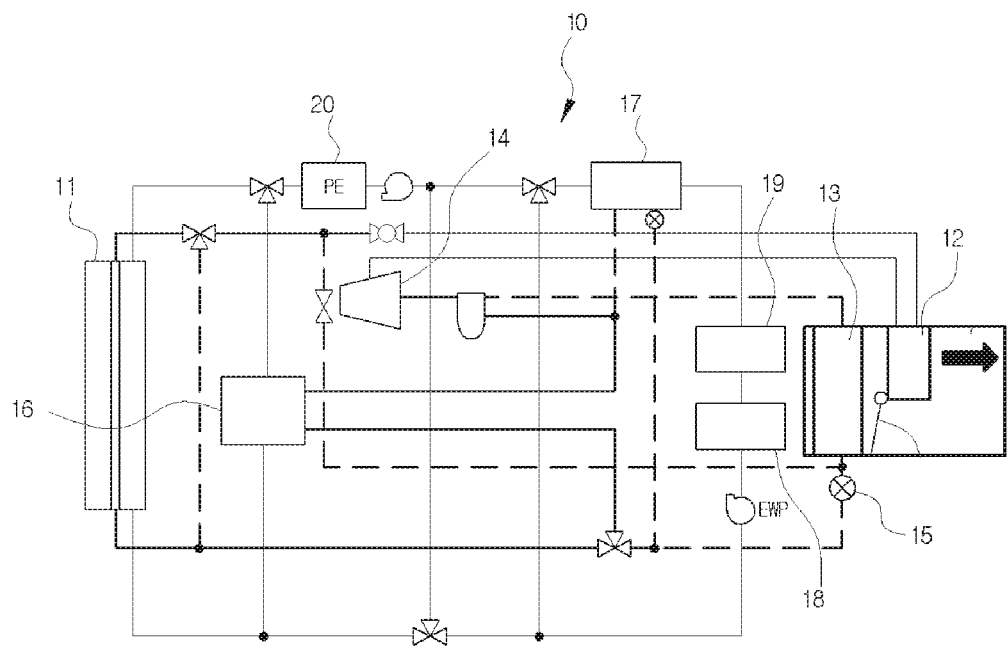
FIG. 1 is a configuration diagram of a conventional heat pump system for a vehicle.

1: thermal management system for vehicle
110: second heat exchanger 120: indoor heat exchanger
122: coolant-refrigerant heat exchanger 124: heater core
130: evaporator 140: compressor
150: expansion means 160: waste heat recovery chiller 170: battery chiller 180: water-cooling type battery module 190: water-heating type PTC heater 200: electric part 210: air conditioning case 211: temperature control door 300: controller S100 to S400: respective steps of method for controlling water-heating type PTC heater according to the present invention

BEST MODE

Hereinafter, a thermal management system for a vehicle and a method for controlling a water-heating type PTC heater thereof according to the present invention as described above will be described in detail with reference to the accompanying drawings.

A thermal management system 1 for a vehicle according to an exemplary embodiment of the present invention is divided into a refrigerant line R having thereon a first heat exchanger, a second heat exchanger, and an expansion valve, a coolant line W for cooling or heating a battery, and a controller 300.

At this time, the coolant line W is formed to include a waste heat recovery chiller 160, a battery chiller 170, a water-cooling type battery module 180, a water-heating type PTC heater 190, an electric part 200, etc. A heat source supplied from the water-heating type PTC heater is supplied to the refrigerant line through the waste heat recovery chiller.

Hereinafter, each of the constitutions of the thermal management system 1 for a vehicle as described above will be described.

First, the compressor 140 sucks and compresses refrigerant and discharges the compressed refrigerant.

Figure 2:
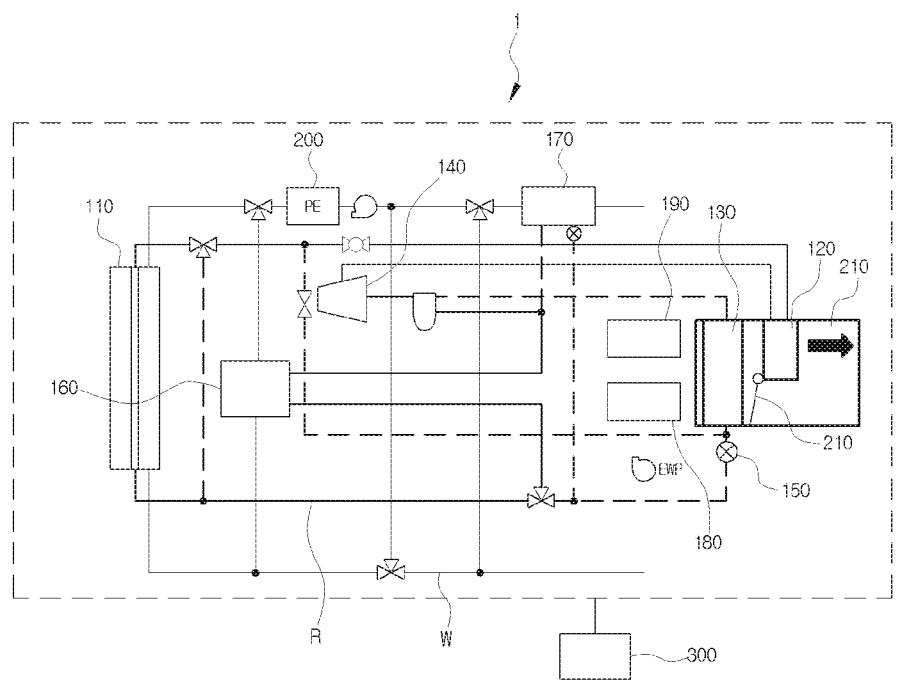
FIG. 2 is a configuration diagram of a thermal management system for a vehicle according to a first exemplary embodiment of the present invention.
Figure 3:
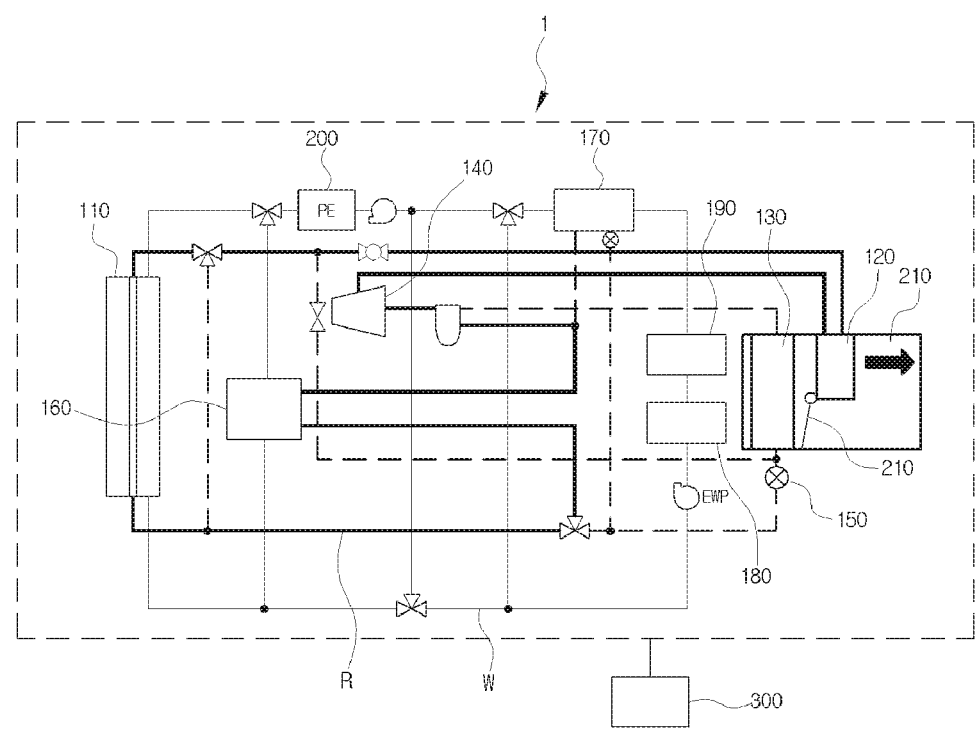
FIG. 3 is a configuration diagram showing a refrigerant circulation path during a heating mode in FIG. 2.
Figure 4:
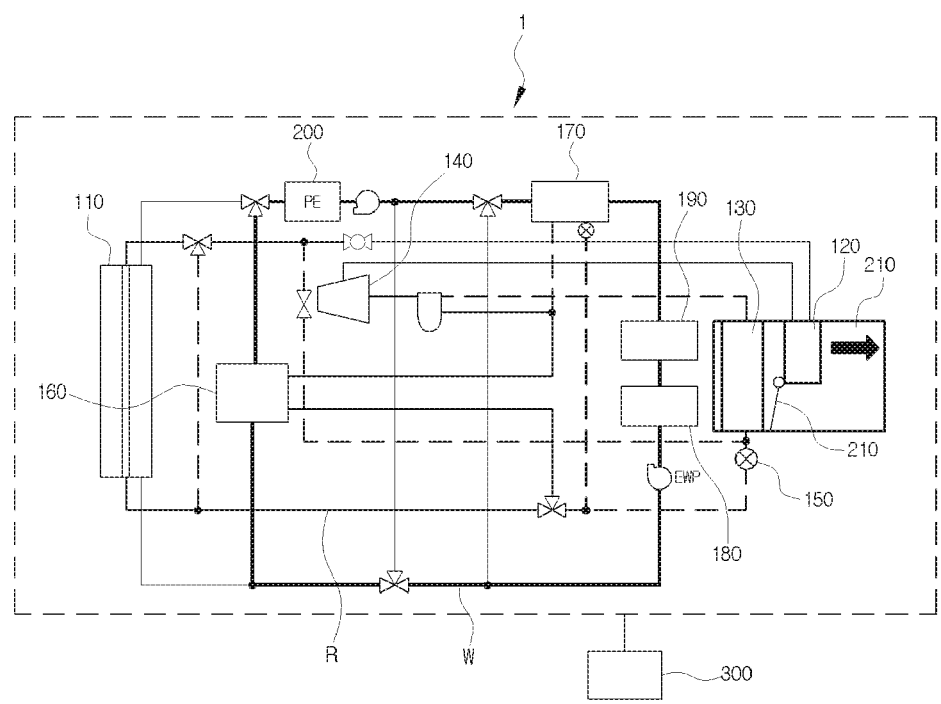
FIG. 4 is a configuration diagram showing a coolant circulation path during the heating mode in FIG. 2.
Figure 6:
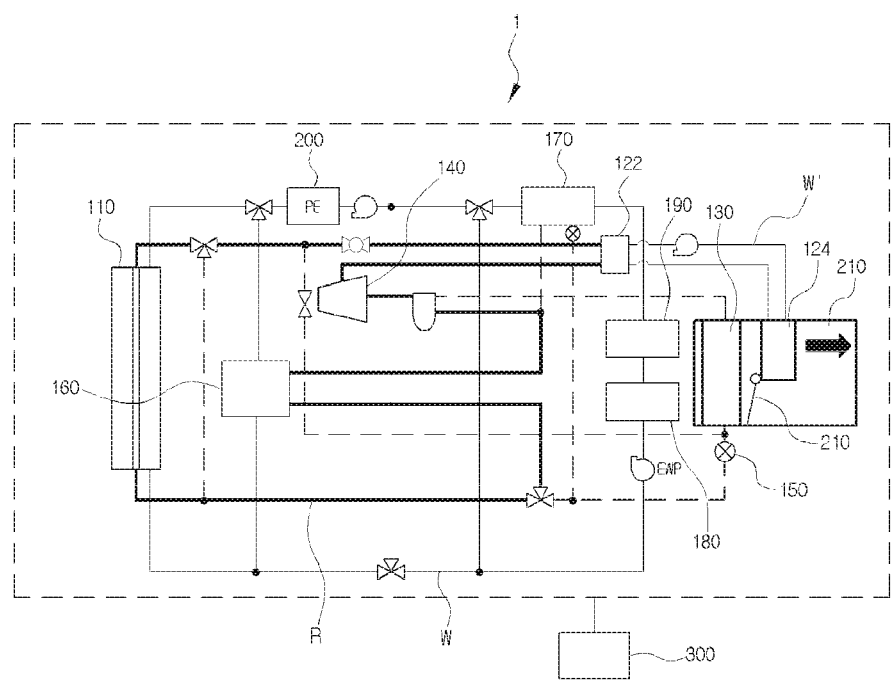
FIG. 6 is a configuration diagram showing a refrigerant circulation path during a heating mode in FIG. 5.
Figure 7:
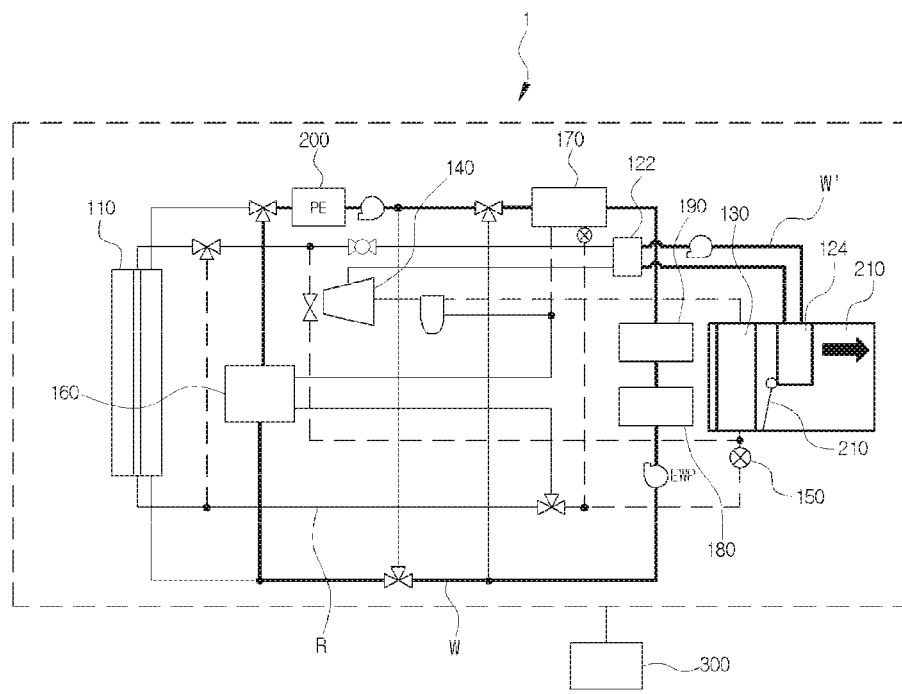
FIG. 7 is a configuration diagram showing a coolant circulation path during the heating mode in FIG. 5.

The first heat exchanger may be an indoor heat exchanger 120 or a coolant-refrigerant heat exchanger 122. FIGS. 2 to 4 illustrate a first exemplary embodiment in which the first heat exchanger is the indoor heat exchanger 120, and FIGS. 5 to 7 illustrate a second exemplary embodiment in which the first heat exchanger is the coolant-refrigerant heat exchanger 122.

Referring to FIG. 2 for the first exemplary embodiment, the indoor heat exchanger 120, which heat-exchanges the refrigerant discharged from the compressor 140, is installed inside an air conditioning case 210 and connected through a refrigerant circulation line to an outlet of the compressor 14 to heat-exchange the refrigerant discharged from the compressor 140 with air flowing in the air conditioning case 210.

The indoor heat exchanger 120 serves as a heater in a heating cycle, and also bypasses the refrigerant introduced through the refrigerant circulation line or serves as a condenser in a cooling cycle.

Figure 5:
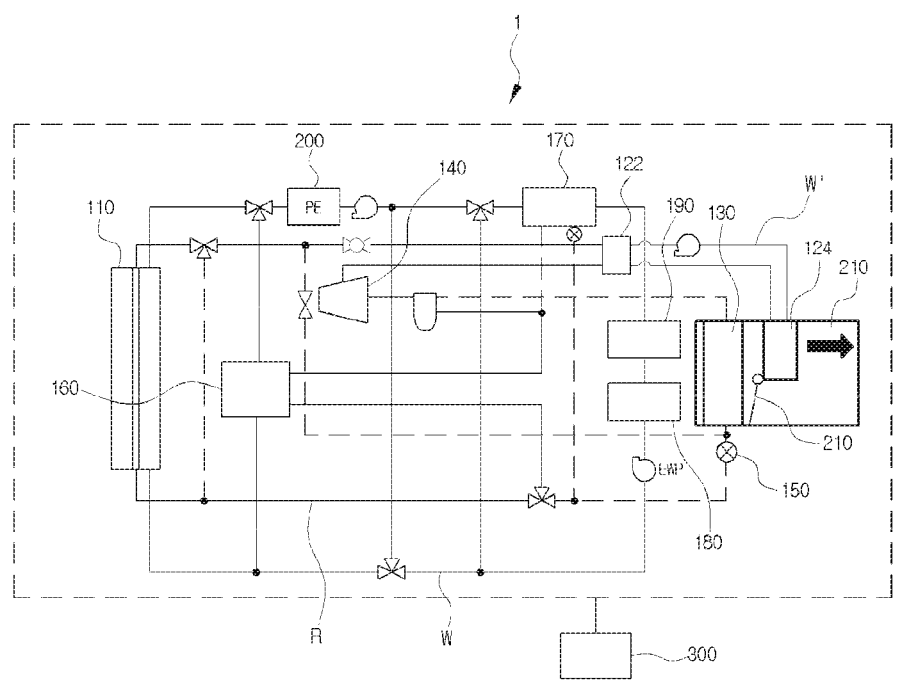
FIG. 5 is a configuration diagram of a thermal management system for a vehicle according to a second exemplary embodiment of the present invention.

Referring to FIG. 5 for the second exemplary embodiment, the coolant-refrigerant heat exchanger 122 is connected through the refrigerant circulation line to the outlet of the compressor 140 to heat-exchange the refrigerant discharged from the compressor 140 and the coolant flowing through the coolant line W or a separate coolant line W'. In this case, the thermal management system for a vehicle further includes a heater core 124 connected to the coolant-refrigerant heat exchanger 122 through the coolant line W or the separate coolant line W'. In FIG. 5, it is illustrated that the coolant-refrigerant heat exchanger 122 and the heater core 124 are connected through the separate coolant line W', but the present invention is not limited thereto. For example, a bypass line or a branch line may be formed from the coolant line W to allow the coolant to flow into the heater core 124.

The heater core 124 connected to the coolant-refrigerant heat exchanger 122 is installed inside the air conditioning case 210 (in a similar manner to the indoor heat exchanger 120 in FIG. 2), and serves as a heater in the heating cycle.

Like the first heat exchanger, the evaporator 130 is installed inside the air conditioning case 210 to heat-exchange the refrigerant supplied from the compressor 140 with ambient air in the air conditioning case 210, thereby cooling the air in the cooling cycle.

Between the evaporator 130 and the first heat exchanger in the air conditioning case 210, a temperature control door 211 is installed to control an amount of air bypassing the first heat exchanger and an amount of air passing through the first heat exchanger.

The temperature control door 211 may appropriately control an amount of air discharged from the air conditioning case 210 by controlling the amount of air bypassing the first heat exchanger and the amount of air passing through the first heat exchanger.

An expansion means 150 is installed on the refrigerant circulation line adjacent to an inlet of the evaporator 130 outside the air conditioning case 210 to expand the refrigerant.

At the time of heating, the expanded low-temperature and low-pressure refrigerant is introduced from the first heat exchanger into the second heat exchanger 110, and then heat-exchanged with the ambient air to vaporize the refrigerant. In particular, the second heat exchanger 110 absorbs the ambient heat in the process of vaporizing the low-temperature and low-pressure refrigerant.

When the thermal management system 1 for a vehicle is used in a cooling mode, the second heat exchanger 110 serves as a condenser and the first heat exchanger serves as an evaporator, thereby making it possible to supply cool air to the inside of the vehicle while absorbing ambient heat.

On the contrary, when the thermal management system 1 for a vehicle is used in a heating mode, the second heat exchanger 110 absorbs ambient heat and serves as an evaporator, and the first heat exchanger emits the heat to the outside and serves as a heater, as described above.

In the thermal management system 1 for a vehicle, during the heating mode, the refrigerant is expanded and the expanded refrigerant is vaporized in the second heat exchanger 110 and then secondarily vaporized again in the waste heat recovery chiller 160. Thereafter, the vaporized refrigerant is introduced into the compressor 140.

At this time, the coolant having passed through the water-cooling type battery module 180 recovers energy released from a power electronics (PE) part, which is an electric part 200 for driving an electric vehicle, such as an on-board charger (OBC), a motor, or an electric power control unit (EPCU), and then the coolant is secondarily vaporized by being heat-exchanged with the refrigerant while passing through the waste heat recovery chiller 160.

In addition, when the temperature is low, for example, in the winter, the coolant is heated by operating the water-heating type PTC heater 190 to improve battery efficiency, while charging the battery.

In the present invention, since the coolant passes through not only the PE part but also the water-cooling type battery module 180 and the water-heating type PTC heater 190, the heat generated from the battery while charging the battery is recovered in the waste heat recovery chiller 160, thereby improving heat pump performance.

The controller 300 controls the coolant to be maintained at a predetermined temperature or above, while charging the battery, by using the water-heating type PTC heater 190. In particular, if it is determined that the ambient temperature and the coolant temperature are predetermined temperatures or below while charging the battery, the controller 300 controls the water-heating type PTC heater to be turned on so that heat may be stored in the coolant line.

Hereinafter, a method for controlling the water-heating type PTC heater will be described, in which a heat source for heating is secured by the controller 300 operating the water-heating type PTC heater 190 and thereby additionally heating the coolant, while charging a battery, in the thermal management system 1 for a vehicle as described above.

Here, for the heating mode, the thermal management system 1 for a vehicle is configured such that the refrigerant circulates through the second heat exchanger 110, the waste heat recovery chiller 160, the compressor 140, and the first heat exchanger (the indoor heat exchanger 120 in the first exemplary embodiment as illustrated in FIG. 3, and the coolant-refrigerant heat exchanger 122 in the second exemplary embodiment as illustrated in FIG. 6) as illustrated in FIG. 3 or 6, or is configured such that the coolant passes through the water-cooling type battery module 180, the water-heating type PTC heater 190, the battery chiller 170, the electric part 200, and the waste heat recovery chiller 160 as illustrated in FIG. 4 or 7.

To do so, the method for controlling the water-heating type PTC heater according to the present invention includes a first step of charging a battery of the water-cooling type battery module 180; a second step of measuring an ambient temperature; a 2-1-st step of turning off the water-heating type PTC heater 190, if the ambient temperature is higher than a first preset temperature; a third step of measuring a coolant temperature, if the ambient temperature is lower than the first preset temperature; a 3-1-st step of turning off the water-heating type PTC heater 190, if the coolant temperature is higher than a second preset temperature; and a fourth step of turning on the water-heating type PTC heater 190, if the coolant temperature is lower than the second preset temperature.

Figure 8:
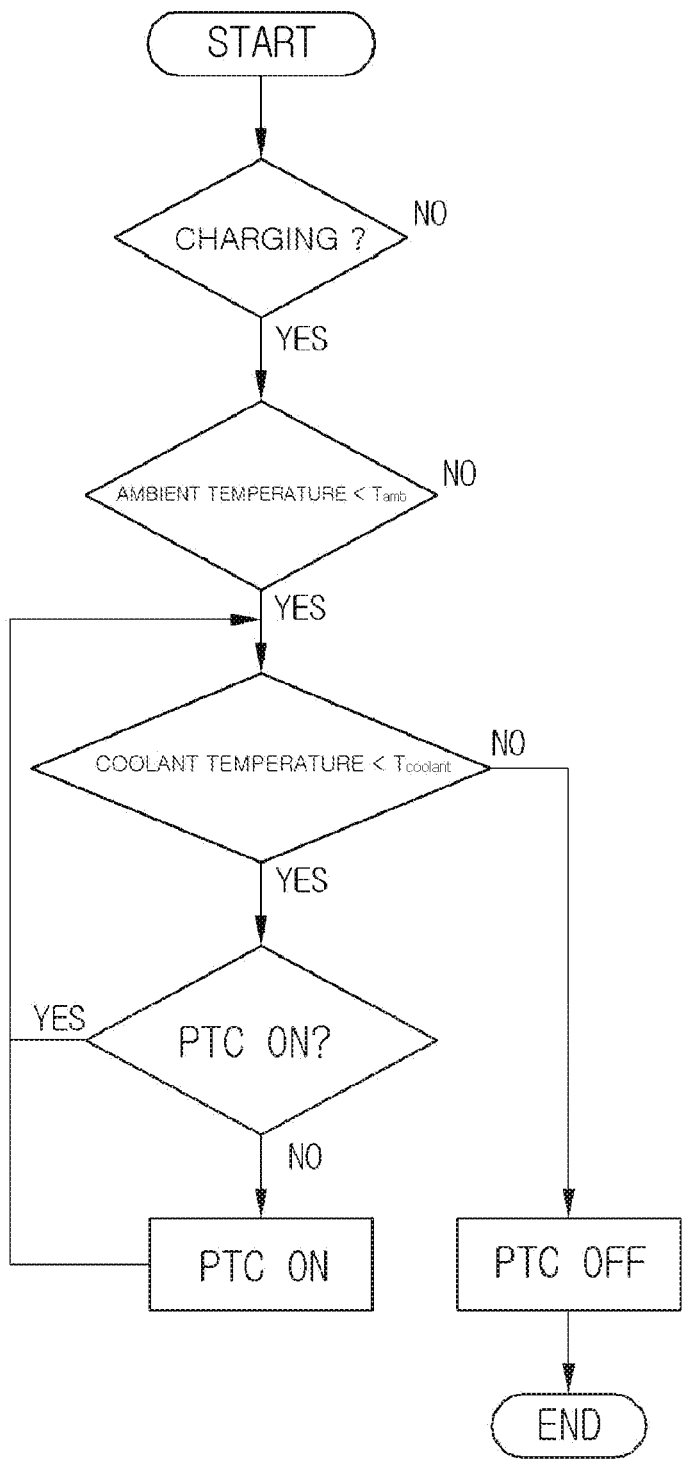
FIG. 8 is a flowchart showing a method for controlling a water-heating type PTC heater according to an exemplary embodiment of the present invention.

Referring to FIG. 8, the method for controlling the water-heating type PTC heater according to the present invention will be described in more detail below.

First, a battery of the water-cooling type battery module 180 is charged.

Next, an ambient temperature is measured while charging the battery. If the ambient temperature is higher than a first preset temperature, the water-heating type PTC heater 190 is turned off. If the ambient temperature is lower than the first preset temperature, a coolant temperature is measured.

At this time, the first preset temperature is approximately 0° C. When the battery is charged in the winter and is not rapidly activated due to the cool ambient temperature, the thermal management system 1 for a vehicle heats the coolant circulated in the water-cooling type battery module 180 by using the water-heating type PTC heater 190, thereby improving battery efficiency.

Next, if the coolant temperature is higher than a second preset temperature, the water-heating type PTC heater 190 is turned off. If the coolant temperature is lower than the second preset temperature, the water-heating type PTC heater 190 is turned on.

In the thermal management system for a vehicle, an electric water pump (EWP) is operated together with the water-heating type PTC heater 190 to heat the coolant.

Here, the second preset temperature is a temperature set to be higher than a coolant temperature for properly operating the battery.

At this point, the second preset temperature may be set to be 15 to 25% higher than the coolant temperature for properly operating the battery.

In the method for controlling the water-heating type PTC heater according to the present invention, after the water-heating type PTC heater 190 is turned on in the fourth step, the third step and the fourth step are repeatedly performed until the coolant temperature reaches the second preset temperature. When the coolant temperature reaches the second preset temperature, the water-heating type PTC heater 190 is turned off.

Accordingly, the thermal management system 1 for a vehicle controlled by the method for controlling the water-heating type PTC heater according to the present invention is capable of securing a heat source for heating by additionally heating the coolant while charging the battery, and recovering the additionally secured heat of the coolant in the waste heat recovery chiller 160.

That is, in the conventional art, the waste heat recovery chiller 160 is able to use the waste heat from the battery and from the PE part only under a substantially high load condition. When compared thereto, the present invention is different in that when a vehicle battery is charged by being connected to an electric plug, coolant is heated to a temperature higher than the temperature that the battery requires so that the heat can be recovered in the waste heat recovery chiller 160.

In electric vehicles, the total mileage depending on fuel efficiency is a very important factor. Typically, a decrease in mileage is greatly affected by energy consumption for heating. However, the present invention uses electric energy at the time of charging, and thus the fuel efficiency is not affected. Furthermore, a heat source for heating is sufficiently secured at the beginning of driving, thereby securing heat pump efficiency and increasing fuel efficiency.

Figure 9:
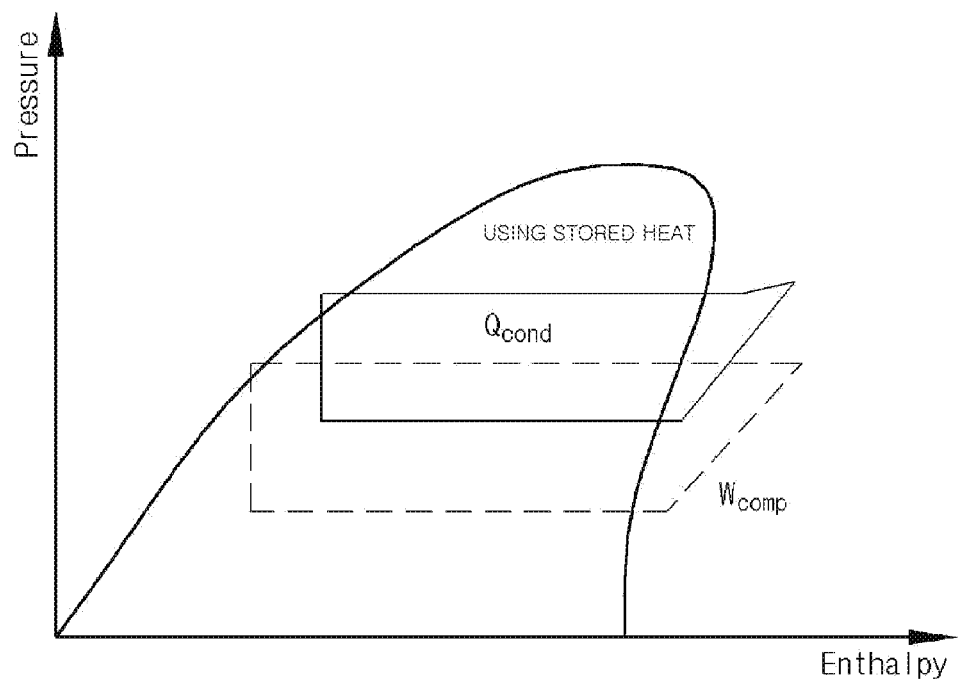
FIG. 9 is a line graph showing the relationship between pressure (P) and enthalpy (H) of refrigerant, in a thermal management system for a vehicle according to an exemplary embodiment of the present invention.

As illustrated in FIG. 9, the present invention is capable of raising a pressure on a low pressure side by increasing a heat source temperature, when compared to the conventional art (marked by a dotted line), resulting in an increase in a refrigerant flow rate, thereby increasing an amount of heat dissipation and enhancing heating efficiency.

Based on the rise in pressure by increasing a temperature of the heat source of the heat pump, the present invention is also capable of reducing power consumption for air conditioning, and accordingly an improvement of the electric vehicle in fuel efficiency can be expected.

The present invention is not limited to the abovementioned exemplary embodiments, but may be variously applied. In addition, the present invention may be variously modified by those skilled in the art to which the present invention pertains without departing from the gist of the present invention claimed in the claims.

INDUSTRIAL APPLICABILITY

In electric vehicles, the total mileage depending on fuel efficiency is a very important factor. Typically, a decrease in mileage was greatly affected by energy consumption for heating. However, the present invention uses electric energy at the time of charging, and thus the fuel efficiency is not affected. Furthermore, a heat source for heating is sufficiently secured at the beginning of driving, thereby securing heat pump efficiency and increasing fuel efficiency. Based on the rise in pressure by increasing a temperature of the heat source of the heat pump, the present invention is also capable of reducing power consumption for air conditioning, and accordingly an improvement of the electric vehicle in fuel efficiency can be expected.

The invention claimed is:

1. A thermal management system for a vehicle, comprising:
   a refrigerant line having a compressor, a first heat exchanger, a second heat exchanger, and an expansion means;
   a coolant line through which coolant for cooling or heating a battery is circulated and on which a PTC heater that uses water for heating is disposed;
   a controller, said controller maintaining the coolant at a predetermined temperature or above while charging the battery via the PTC heater;
   an electric part on the coolant line;
   a waste heat recovery chiller supplying waste heat from the electric part to the refrigerant line; and
   a battery chiller cooling the battery using refrigerant,
   wherein a heat source supplied from the PTC heater is supplied to the refrigerant line through the waste heat recovery chiller.

2. The thermal management system for a vehicle of claim 1, wherein, while charging the battery, if it is determined that an ambient temperature and a coolant temperature are predetermined temperatures or below while charging the battery, the controller turns on the PTC heater to store heat in the coolant line.

3. The thermal management system for a vehicle of claim 1, wherein the first heat exchanger is an indoor heat exchanger or a coolant-refrigerant heat exchanger.

4. The thermal management system for a vehicle of claim 3, further comprising a heater core connected to the coolant-refrigerant heat exchanger through the coolant line or a separate coolant line, when the first heat exchanger is the coolant-refrigerant heat exchanger.

5. The thermal management system for a vehicle of claim 4, wherein the thermal management system for a vehicle is configured such that during a heating mode, refrigerant circulates through the second heat exchanger, a waste heat recovery chiller, the compressor, and the coolant-refrigerant heat exchanger, and the coolant passes through a water-cooling type battery module, the PTC heater, a battery chiller, an electric part, and the waste heat recovery chiller.

6. A method for controlling the PTC heater of the thermal management system for a vehicle according to claim 1, comprising:
   a first step of charging a battery of a water-cooling type battery module disposed on the coolant line;
   a second step of measuring an ambient temperature;
   a step of turning off the PTC heater, if the ambient temperature is higher than a first preset temperature;
   a third step of measuring a coolant temperature, if the ambient temperature is lower than the first preset temperature;
   a step of turning off the PTC heater, if the coolant temperature is higher than a second preset temperature; and
   a fourth step of turning on the PTC heater, if the coolant temperature is lower than the second preset temperature.

7. The method for controlling the PTC heater of claim 6, wherein the second preset temperature is set to be higher than a coolant temperature for properly operating the battery.

8. The method for controlling the PTC heater of claim 7, wherein the second preset temperature is set to be 15 to 25% higher than the coolant temperature for properly operating the battery.

9. The method for controlling the PTC heater of claim 6, wherein after the PTC heater is turned on in the fourth step, the third step and the fourth step are repeatedly performed until the coolant temperature reaches the second preset temperature.

10. The method for controlling the PTC heater of claim 6, wherein the thermal management system for a vehicle further comprises, on the coolant line, an electric part, a waste heat recovery chiller supplying waste heat from the electric part to the refrigerant line, and a battery chiller cooling the battery using refrigerant,
   a heat source supplied from the PTC heater is supplied to the refrigerant line through the waste heat recovery chiller, and
   thermal energy stored in the PTC heater in the fourth step is recovered in the waste heat recovery chiller to be used as a heat source for heating when the thermal management system for a vehicle is operated in a heating mode.

11. A thermal management system for a vehicle, comprising:
   a refrigerant line having a compressor, a first heat exchanger, a second heat exchanger, and an expansion means;
   a coolant line through which coolant for cooling or heating a battery is circulated and on which a PTC heater using water for heating is disposed; and
   a controller controlling the coolant to be maintained at a predetermined temperature or above, while charging the battery, using the PTC heater;
   wherein the first heat exchanger is an indoor heat exchanger, and
   the thermal management system for a vehicle is configured such that during a heating mode, refrigerant circulates through the second heat exchanger, a waste heat recovery chiller, the compressor, and the indoor heat exchanger, and the coolant passes through a water-cooling type battery module, the PTC heater, a battery chiller, an electric part, and the waste heat recovery chiller.

* * * * *